Jan. 7, 1930.  E. OEHMICHEN  1,742,665
SUSTAINING PROPELLER OF THE HELICOPTER TYPE
Filed March 16, 1928  2 Sheets-Sheet 1

E. Oehmichen
INVENTOR

By: Marks & Clerk
Attys.

Jan. 7, 1930.  E. OEHMICHEN  1,742,665
SUSTAINING PROPELLER OF THE HELICOPTER TYPE
Filed March 16, 1928  2 Sheets-Sheet 2

E. Oehmichen
INVENTOR

By: Marks & Clerk
ATTYS.

Patented Jan. 7, 1930

1,742,665

UNITED STATES PATENT OFFICE

ETIENNE OEHMICHEN, OF VALENTIGNEY, FRANCE

SUSTAINING PROPELLER OF THE HELICOPTER TYPE

Application filed March 16, 1928, Serial No. 262,238, and in France July 19, 1927.

In the preceding patent application filed June 13th, 1927, Serial No. 198,674, it was proposed to effect the automatic correction of the incidence of the blades of a lifting or sustaining propeller, which correction varies continuously during each revolution of the propeller, in such manner as to eliminate all prejudicial action of an unbalancing cause, such for instance as the action of a relative wind, whether horizontal or oblique, tending to overturn the helicopter. One of the important features of the aforesaid invention consists in the fact that in order to take due account of the gyroscopic action of the propeller, the correcting means are adapted to produce the maximum and the minimum incidence corrections at the instants at which the blades proceed, not in the vertical plane of the unbalancing (or the plane of the couple of the external overturning forces) but in the vertical plane perpendicular to the said unbalancing plane. The reason for this change in the angle is based upon the known property of the gyroscope according to which, when a transverse force acts upon the axis of the gyroscope, the latter will disappear perpendicularly to the plane of the said force and the said axis.

The present invention is also based upon the use of gyroscopic effects to assure the equilibrium of a helicopter by producing an automatic variation of the incidence of the blades of a propeller under the action of unbalancing causes, so that the maxima and minima of incidence will take place at the instants at which the blades pass through the axial plane perpendicular to the unbalancing plane; but the means employed to obtain this result are of a more simple nature than those described in the aforesaid patent.

In the appended drawings which are given by way of example:—

The said apparatus or helicopter which is held in the air by the said propeller, has not been represented, since it may have any suitable construction, and this is quite distinct from the structure and functioning of the device according to the invention.

Figure 1:
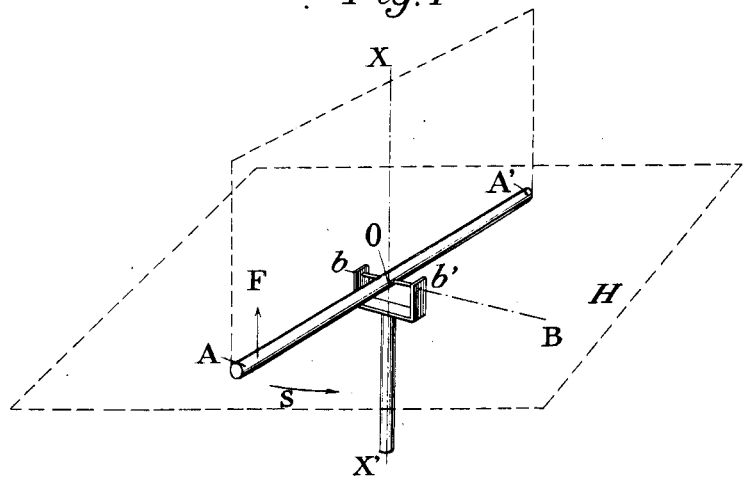
Fig. 1 is a diagram explaining the gyroscopic action.

Let us consider for instance, as shown in Fig. 1, a bar A A' pivotally mounted on an axle $b\ b'$ perpendicular to a shaft X X' and rotating in the direction S; in the normal conditions the bar A A' when rotating will tend to place itself in a plane H perpendicular to X X'.

If the bar is subjected to an unbalancing effect which tends for instance to raise the end of the said bar in the direction of the arrow F, and whose maximum is situated in a plane such as OAX, the said bar will become separated from the plane H and forms with it a variable angle which passes through a maximum when the bar is situated in the plane BOX perpendicular to AOX.

Figure 4:
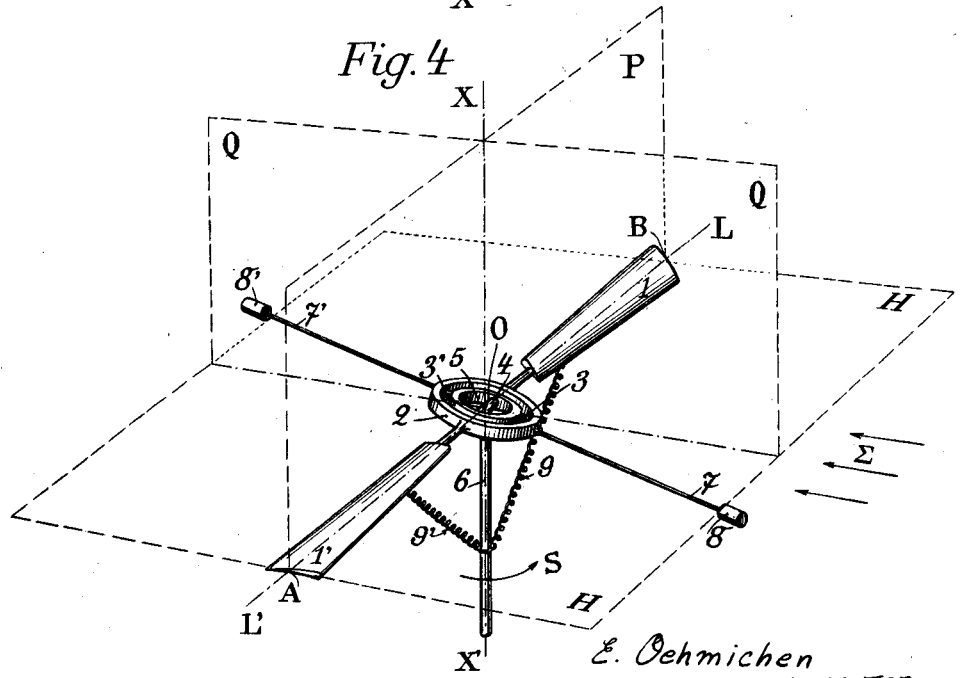

This action is employed twice in the apparatus which will be described with reference to Figs. 2 and 4.

6 is a driving shaft carrying a cross shaft 4 upon which is pivotally mounted a ring 5; on its diameter perpendicular to the shaft 4, said ring 5 carries two trunnions 3—3' to which is pivoted a second ring 2. Upon the latter are rigidly mounted two rods 7—7' carrying two respective heavy members 8—8' and two respective propeller blades 1—1'. The rods 7—7' are in line with the trunnions 3—3' and the lengthwise axis L—L' of the blades 1—1' is perpendicular to the rods 7—7'.

The springs 9 and 9' are stretched between the shaft 6 and the blades 1—1' so as to maintain the latter perpendicular to the shaft 6 when they are not affected by any balancing cause. The blades 1—1', which are thus connected with the shaft 6 by a Cardan joint, are rotatable on their axis L—L' so that their incidence varies. In fact, when the axis L—L' is situated in the plane H perpendicular to the shaft 6, the combination consisting of the ring 5—2 and the propeller blades can oscillate as a whole about the shaft 4, and in this case the direction of L—L' coincides with the direction of 4.

On the other hand, when the shaft L—L' is inclined from the plane H, the said combination of the blades and the rings 5—2 can still oscillate about the shaft 4; in this oscillating motion, the axis L—L' describes a conical surface about the axis 4; so that it will be separated—at the front or rear—from the plane formed by 6 and 4, while the rods 7—7' move in a plane perpendicular to the axis 4.

In all cases, the oscillating motion on the axis L—L' will increase the incidence of one blade and diminish the incidence of the other blade.

Figure 2:
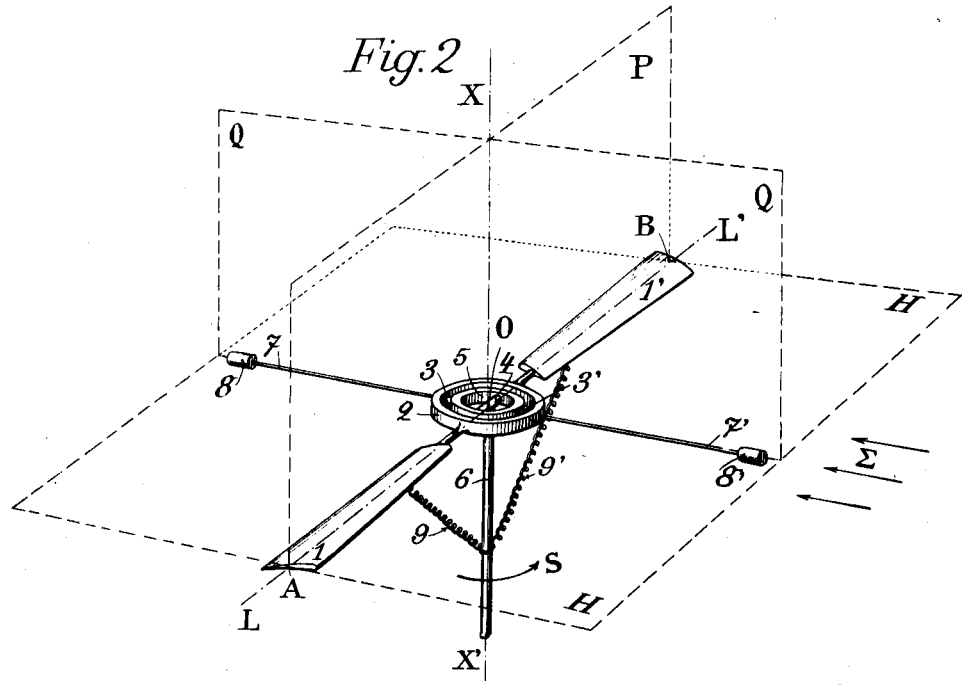
Fig. 2 is a perspective view of a sustaining propeller with automatic correction according to the present invention.
Figure 3:
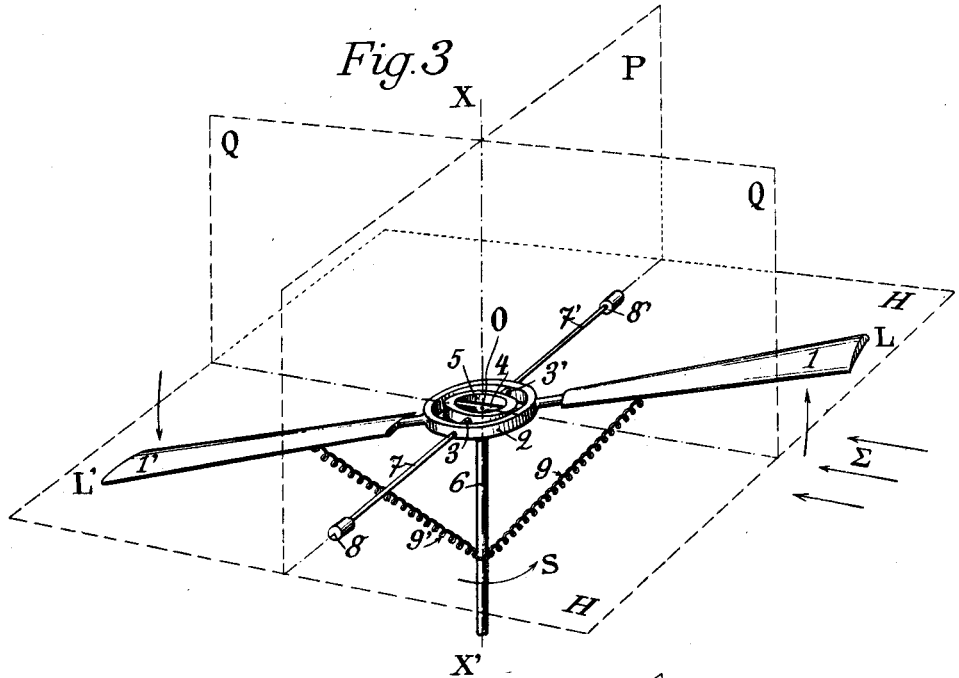
Figs. 3 and 4 show two other positions of a given propeller.

If the system is acted upon by a transverse wind coming from $\Sigma$, and if P and Q represent axial planes which are respectively perpendicular and parallel to the direction $\Sigma$, the propeller will be subjected to a maximum unbalancing stress when the axis of the blades L—L' passes through the plane P (Fig. 2). The blade 1 tends to rise above the normal plane of rotation and the blade 1' to descend below this plane, but the gyroscopic action brings to right angle and forward according to the direction of rotation, the effect of the unbalancing couple, so that in reality the propeller will oscillate in such manner that the inclination of its axis L—L' will pass through a maximum when this latter is situated in the plane Q parallel to the direction of the wind $\Sigma$ (Fig. 3).

At this moment, the propeller being inclined from the plane H, the above specified property of Cardan joints will occur, i. e. the plane containing the axis L—L of the blades and the axis of rotation 5 may no longer coincide with the plane formed by 4 and 6, but may differ from it by a certain angle, which depends upon the inclination of the blades and on the driving torque. This difference or lag is made evident by a rotation of the blades on the axis L—L; but it is to be noted that this rotation can only take place by imparting to the ring 2 and the bars 7—7 an angular acceleration in an axial plane 7—7'—6. In this case, gyroscopic effects enter in, and these react in turn in the direction of the motion and at 90° to the position of the maximum unbalancing, thus producing the desired effect, i. e. the maximum separation of the bars 7—7' from the plane of rotation H, when the said bars themselves proceed again in the plane Q, and hence at 180° difference (or lag) in the direction or motion, relatively to the initial unbalancing cause due to the action of the wind upon the blades (Fig. 4).

The final result will be that the blade passes through a minimum incidence when proceeding in the direction OA, and through a maximum incidence in the direction OB, and thus the equilibrium is again established.

The springs 9—9' should be so constructed that the angular spacing of the blades 1—1' relatively to the plane H will be such that in conjunction with the gyroscopic efforts of the set of blades and bars, the corrections will be effected according to the desired intensity.

The said springs will thus serve the same purpose as the action of a pilot who regulates the apparatus in proportion to the degree of the unbalancing cause.

Obviously, the heavy members 8—8' may be replaced by lifting elements or blades which serve in combination with the blades 1—1' to form a 4-blade propeller, the Cardan device remaining the same. Herein the regulation of the apparatus is effected in such manner that each blade will regulate or be regulated in turn.

The functioning conditions however are less good since the nutation movements produce in the propeller reactions of inertia which may be detrimental to the resistance of said propeller.

The Cardan device may be placed at right angles to the aforesaid disposition, or at any other angle, provided the reaction springs are always used; but in this case the regulation is not as good, because the incidence corrections will always be made by changing the trajectory, and the propeller will thus be affected by the external wind, due to the increase in its drift.

It should be understood that the members 2 and 5 herein specified as rings, may be given various shapes, for instance as frames, shells or the like, as in the known Cardan joints.

Having thus described my apparatus, what I claim as new therein, and my own invention, is:—

1. In a helicopter, the combination of a driving shaft, a transverse bar upon the said shaft, a ring pivoted at diametrically opposite points upon the said bar, a second ring pivoted at diametrically opposite points upon the first ring about an axis which is perpendicular to the axis of the said transverse bar, two propeller blades rigidly secured to the second ring and perpendicularly directed to the pivoting axis of the said second ring, two elongated members rigidly secured to the second ring and directed in line with the said pivoting axis of the second ring and springs connecting the said blades with the said shaft and adapted to bring back the said blades into a direction which is perpendicular to the said shaft.

2. In a helicopter, the combination of a driving shaft, a propeller including a boss and blades rigidly secured to the boss, heavy masses placed on both sides of the said boss on an axis perpendicular to the longitudinal axis of the blades, a connecting element adapted to transmit the rotation of the driving shaft to the propeller, this element being articulated to the shaft about an axis perpendicular to that of this shaft and being articulated to the boss of the propeller about an axis perpendicular to the preceding one and coincident with the axis of the said heavy masses and elastic means connecting the blades of the propeller to the driving shaft and adapted to place the propeller perpendicularly to the driving shaft.

3. In a helicopter, the combination of a driving shaft, a propeller including a boss and blades rigidly secured to the boss, said boss having the form of a ring, a smaller ring mounted freely in the interior of the first ring, rods fixed to the second ring and directed perpendicularly to the longitudinal axis of the propeller blades, heavy masses on these rods, the boss of the propeller being articulated to these rods, the said second ring being articulated to the driving shaft about an axis perpendicular to this shaft and the said rods and elastic means connecting the propeller blades to the driving shaft and adapted to place the propeller perpendicularly to the driving shaft.

4. In a helicopter, the combination of a driving shaft, a propeller including a boss and blades, heavy masses placed on both sides of the propeller on an axis perpendicular to the longitudinal axis of the blades, a Cardan joint one axis of which is mounted on the driving shaft perpendicularly thereto and the other axis perpendicularly to the preceding one is mounted on the boss of the propeller in coincidence with the axis of the heavy masses and elastic means connecting the propeller to the driving shaft and tending to maintain the longitudinal axis of the blades perpendicularly to this shaft.

In testimony whereof I have hereunto affixed my signature.

ETIENNE OEHMICHEN.